No. 893,304. PATENTED JULY 14, 1908.
E. H. BUTERBAUGH.
FISH HOOK.
APPLICATION FILED JAN. 24, 1908.
Fig.1. Fig.2.
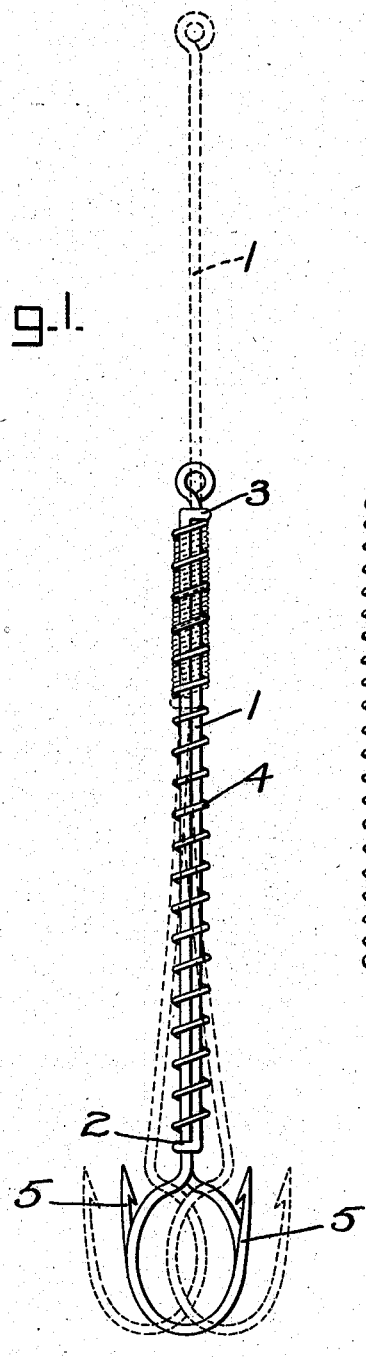
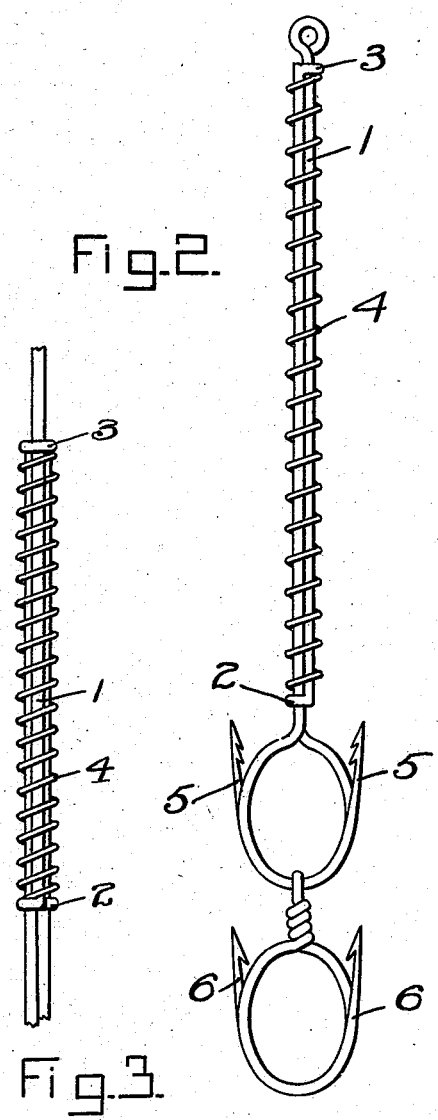
Fig.3.
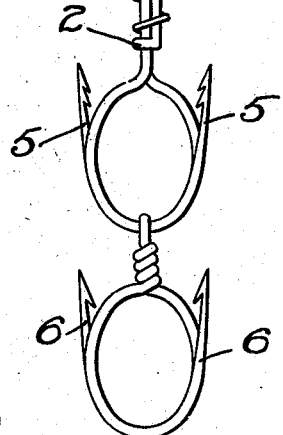
Witnesses
J. H. Miller
M. O. Bowling
Inventor
E. H. Buterbaugh.
By D. Swift & Co.
Attorneys

UNITED STATES PATENT OFFICE.

ELLIS H. BUTERBAUGH, OF SUMMERVILLE, PENNSYLVANIA, ASSIGNOR OF ONE-THIRD TO WILLIAM E. GUTHRIE, OF HEATHVILLE, PENNSYLVANIA.

FISH-HOOK.

No. 893,304.   Specification of Letters Patent.   Patented July 14, 1908.

Application filed January 24, 1908. Serial No. 412,478.

*To all whom it may concern:*

Be it known that I, ELLIS H. BUTERBAUGH, a citizen of the United States, residing at Summerville, in the county of Jefferson and State of Pennsylvania, have invented a new and useful Fish-Hook; and I do hereby declare the following to be a full, clear, and exact description of the invention, such as will enable others skilled in the art to which it appertains to make and use the same.

The invention relates to improvements in fish hooks, and has for its object to provide an improved device of this character of simple efficient and durable construction.

In the drawings, Figure 1 is an elevation of a twin fish hook, constructed in accordance with this invention. Fig. 2 is a similar view of a modified form. Fig. 3 is a view of a part of the device, in elevation taken at right angles to Fig. 1, showing the rod 1, loops 2 and 3 and spring 4.

Referring to the drawings, 1 designates a rod which terminates in a loop 2, which loop slidably engages the shanks of the twin fish hooks. The upper part of the twin hooks also forms a loop 3, which slidably engages the rod 1. A spring 4 is mounted on the rod and the shanks and is adapted to push the loops 2 and 3 apart. When the hooks 5, engage the mouth of a fish, and the fisherman begins to draw in, the spring 4 is designed to cause gentleness in pulling the fish so that the hook will not be snatched out of the fish's mouth. Furthermore, as the spring begins to yield, the shanks of the hook will begin to spread, thereby holding the fish more firmly. If desired, a second pair of hooks 6 may be suspended from the hooks 5.

What is claimed is,

1. A pair of fish hooks, composed of a piece of wire bent upon itself, the extremities forming hooks and the bend forming a loop, and means whereby said hooks may be permitted to yield when the same are engaging a fish.

2. A device of the class described, comprising a rod, a pair of hooks having a loop mounted thereon, the lower part of said rod also forming a loop, and slidably engaging the shanks of said hooks, a spring interposed between said loops, whereby the hooks are permitted to yield when engaged by a fish.

In testimony whereof I have signed my name to this specification in the presence of two subscribing witnesses.

ELLIS H. BUTERBAUGH.

Witnesses:
 OBADIAH WAMPLER,
 NATHAN A. McLAUGHLIN.